(12) United States Patent
Tiller et al.

(10) Patent No.: US 7,167,983 B1
(45) Date of Patent: Jan. 23, 2007

(54) SYSTEM AND METHOD FOR SECURITY PROJECT MANAGEMENT

(75) Inventors: James Tiller, St. Petersburg, FL (US); Bryan Fish, Dallas, TX (US); Theodore Baker, Tampa, FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 776 days.

(21) Appl. No.: 10/095,541

(22) Filed: Mar. 8, 2002

(51) Int. Cl.
    *G06F 1/24* (2006.01)
(52) U.S. Cl. .................. 713/166; 713/167; 713/168; 713/169
(58) Field of Classification Search ............... 713/166, 713/167, 168, 169
    See application file for complete search history.

(56) References Cited

U.S. PATENT DOCUMENTS

| | | | |
|---|---|---|---|
| 5,216,492 A | | 6/1993 | Dorrough et al. |
| 5,301,105 A | * | 4/1994 | Cummings, Jr. ............... 705/2 |
| 5,483,443 A | * | 1/1996 | Milstein et al. ............... 705/3 |
| 5,551,022 A | * | 8/1996 | Tariq et al. ............... 707/104.1 |
| 5,557,514 A | * | 9/1996 | Seare et al. ............... 705/2 |
| 5,740,248 A | | 4/1998 | Fieres et al. |
| 6,535,227 B1 | | 3/2003 | Fox et al. |
| 6,735,701 B1 | | 5/2004 | Jacobson |
| 6,771,243 B2 | | 8/2004 | Hirohata |
| 6,779,120 B1 | | 8/2004 | Valente et al. |
| 2002/0120865 A1 | | 8/2002 | Schwab et al. |
| 2002/0147803 A1 | | 10/2002 | Dodd et al. |
| 2003/0046853 A1 | | 3/2003 | Goldman et al. |
| 2003/0065942 A1 | | 4/2003 | Lineman et al. |

* cited by examiner

*Primary Examiner*—Thomas R. Peeso

(57) ABSTRACT

A database-modeled security policy includes policy statements stored in a database. Each policy statement has associated standards, guidelines, and procedures. Policy statements are grouped together into tag groups, which are in turn grouped together to form metapolicies. A security administrator uses a security policy management application to create metapolicies for specific audiences. A lightweight directory access protocol module manages access to the security policy. The security policy management application also provides scoring, reporting, and project management functionalities.

19 Claims, 7 Drawing Sheets

SYSTEM AND METHOD FOR SECURITY PROJECT MANAGEMENT

CROSS-REFERENCE TO RELATED APPLICATIONS

This application relates to U.S. patent application Ser. No. 10/096,206, entitled "System and Method for Implementing Security Management Using a Database-Modeled Security Policy," filed on Mar. 8, 2002, and also relates to U.S. patent application Ser. No. 10/095,655, entitled "System and Method for Security Monitoring and Reporting Using a Database-Modeled Security Policy," filed on Mar. 8, 2002. The subject matter of the related applications is hereby incorporated by reference.

BACKGROUND OF THE INVENTION

1. Field of the Invention

This invention relates generally to information security and more particularly to a system and method for implementing security management using a database-modeled security policy.

2. Description of the Background Art

Information security in the context of enterprise intranets and connections to internets focuses on three fundamental goals: confidentiality, integrity, and availability. Confidentiality relates to the need of insuring that information does not get into the wrong hands. Integrity relates to insuring that the information does not change states unless authorized. Availability relates to insuring that the wrong people do not get to the information but that the right people can. Traditionally, security policies have been entombed in paper manuscripts that are static documents conventionally relegated to the shelves of those responsible for observing the policies outlined therein. Further, changes to the security policy require the insertion and/or substitution of various pages of the policy. Insuring that maintenance of an up-to-date policy thus becomes an unwieldy task in an organization of any substantial size.

Information security management in the context of today's networked systems is more than installing burglar alarms and monitoring doors. Information security administrators have to manage and coordinate the implementation of diverse tools and technologies tailored to assure the attainment of security information goals. The various tools must be deployed and their use coordinated to properly maximize their usefulness. A further requirement of modern security information systems is the need to provide meaningful metrics and reporting. In the dynamic environment in which the security information administrator must function, the need to audit and report on the use of software and hardware tools, new systems, new resources, discontinued resources, mergers, etc. is very difficult. A further consideration of the security information administrator is the management of resources. Resource allocation to maximize the usefulness of the various resources is critical. Additionally, resource allocation must be productive to justify the investment.

The prior art takes a combination of various technologies, for example spreadsheet and database technologies and various utilities, and under management of the security information administrator, seeks to manage the different aspects of information security. None of the described technologies are specifically designed to manage the number of resources involved in modern information security. A further limitation of the paper policy is that dynamic searches are not enabled. For example, if it is desired to find the sections of the policy related to firewall administration, a search through the policy must be conducted manually. Additionally, as the management of the security policy is an ongoing process, data generated by the various resources used is not conveniently analyzable by the available resources.

It is technically possible to break the security policy into sections; however, security policies are notorious for having numerous appendices that are constantly referenced throughout the policy. This makes the task of categorizing the various functions and roles assigned in the policy a very time-consuming and difficult task. This situation leads to the current practice of giving every user in the enterprise the entire policy whereas the entire policy should only be accessible by the information security administrator. A measure of access control is lost by this implementation in that every user has knowledge of every other user's roles and responsibilities.

In the administration and management of a security policy, it is of utmost importance that the security information administrator be able to plan for, execute to maximize, and measure the effectiveness of the security policy. Prior art methods of accomplishing these goals fail to adequately meet these needs. A security information system must be able to assign roles to various users within the enterprise, schedule the performance of assigned tasks and dynamically assign users to new/additional roles/tasks. Furthermore, confirmation that the task was performed is required.

SUMMARY OF THE INVENTION

In accordance with the present invention, a system and method are disclosed to implement a database-modeled security policy. One embodiment of the invention includes a security policy stored in a database, a security policy management application that resides in an application server, and a lightweight directory access protocol module for managing access to the security policy. The security policy includes policy statements with associated standards, guidelines, and procedures. Policy statements may be grouped into tag groups and each tag group includes subsections. Tag groups are organized into metapolicies. A policy statement can appear in more than one tag group and a tag group can appear in more than one metapolicy.

A security administrator uses the security policy management application to manage the security policy. Other users, such as auditors, may access the security policy via a web server and a network. The security administrator can create metapolicies tailored for specific audiences.

A comprehensive metapolicy includes each policy statement in the security policy. The comprehensive metapolicy may be organized into several domains and a domain score calculated for each domain. The domain scores are based on local scores for each metapolicy. Local scores are assessed at the standards level by assessors such as the security administrator or other auditors. Local scores and domain scores can be displayed in various ways to allow for flexible reporting on the security posture of the organization implementing the security policy.

The security policy of the invention operates in conjunction with project management tools to support creation and management of security projects. The project management tools include project plans and status reports submitted electronically by project team members for viewing by the security administrator or other project manager.

DETAILED DESCRIPTION OF THE DRAWINGS

Figure 1:
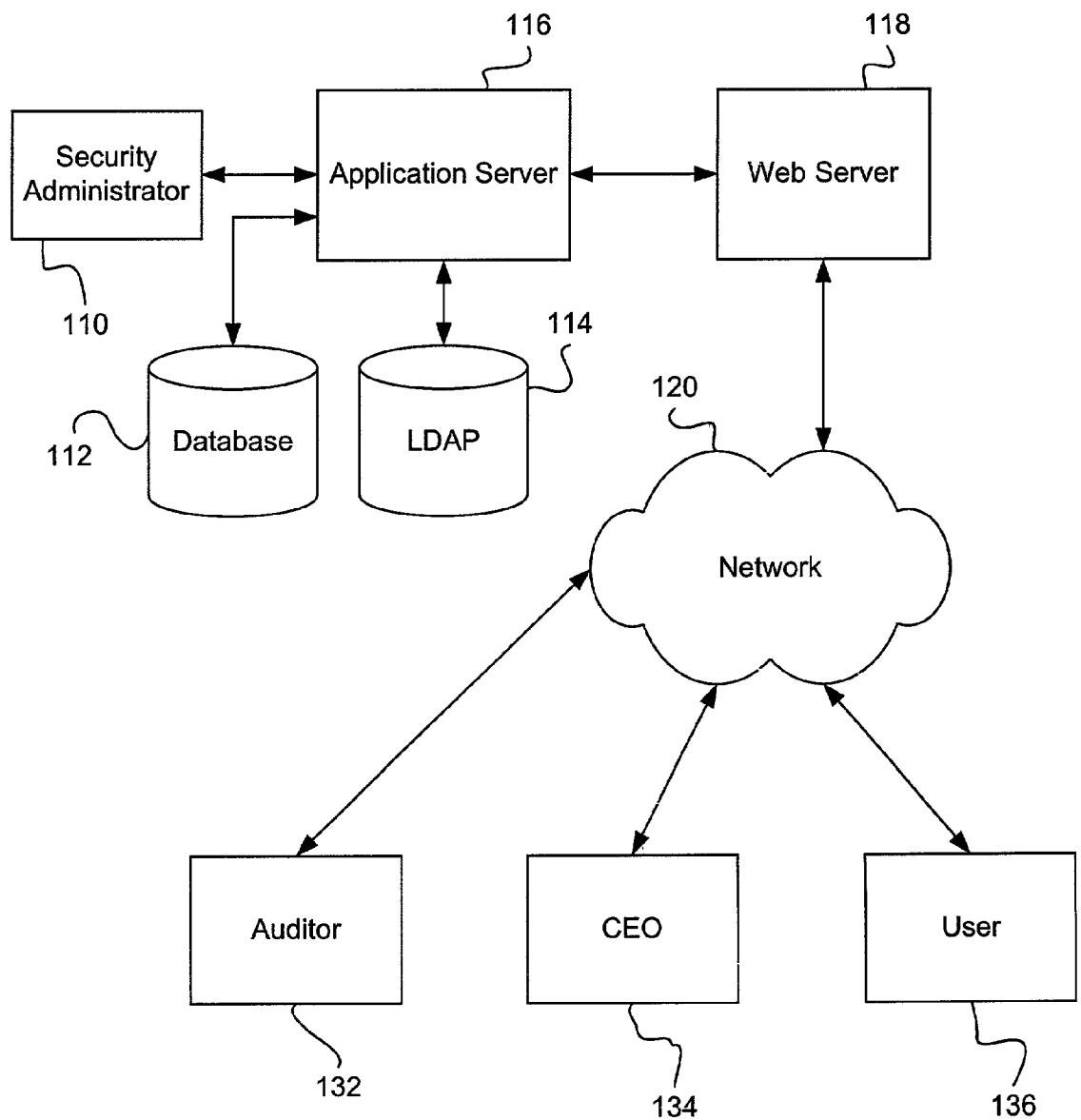
FIG. 1 is a block diagram of one embodiment of an electronic network system, in accordance with the present invention.

FIG. 1 is a block diagram of one embodiment of an electronic network system, in accordance with the present invention. The system of FIG. 1 includes, but is not limited to, a security administrator 110, a database 112, a lightweight directory access protocol module (LDAP) 114, an application server 116, a web server 118, a network 120, an auditor 132, a chief executive officer (CEO) 134, and a user 136. Database 112 includes a security policy for an organization such as a corporation. The security policy encompasses various domains within the corporation, such as network security and security of a physical premises. Security administrator 110 manages the security policy via application server 116 and LDAP 114. Web server 118 provides access via network 120 to application server 116. Network 120 may be implemented as any type of network, for instance a local area network or a wide area network such as the Internet. Auditor 132, CEO 134, and user 136 access network 120 and web server 118 using a web browser application (not shown).

Security administrator 110 may view, manipulate, and edit all areas of the security policy using a security policy management application (not shown). Others have differing levels of access to the security policy, for example CEO 134 may view all areas of the security policy and user 136 may view only selected portions of the security policy, while both are prohibited from making any changes to the security policy.

The security policy includes numerous policy statements that represent an organization's position on particular security topics. For example, one policy statement may be "The organization's computing systems shall have strong passwords." Each policy statement has associated with it standards, guidelines, and procedures, all of which provide detailed information about the policy statement. Standards clearly state security rules, such as "All user passwords shall be at least 8 characters in length," and "All user passwords shall be changed every 90 days." Guidelines are more general, for example "Users should avoid using passwords that can be easily guessed, such as the name of a spouse, child, or a birthdate." Procedures provide step-by-step instructions for carrying out a task associated with a policy statement. An example of a procedure is as follows:

---

Ensure passwords are changed every 90 days.
1. Log into application server as security administrator.
2. Run administrative tool.
3. Go to Security Policy screen.
4. Check box marked "expire passwords."
5. In frequency box, enter "90," in the units box select "days."
6. Click Apply button.
7. Close administrative tool.
8. Log out of application server.
N. Domain N

---

As shown above, the policy statements are grouped into logical sections called domains and each policy statement has associated standards, guidelines, and procedures. The organization of the various policy statements, standards, guidelines, and procedures in database 112 is discussed below in conjunction with FIG. 3.

Figure 2:
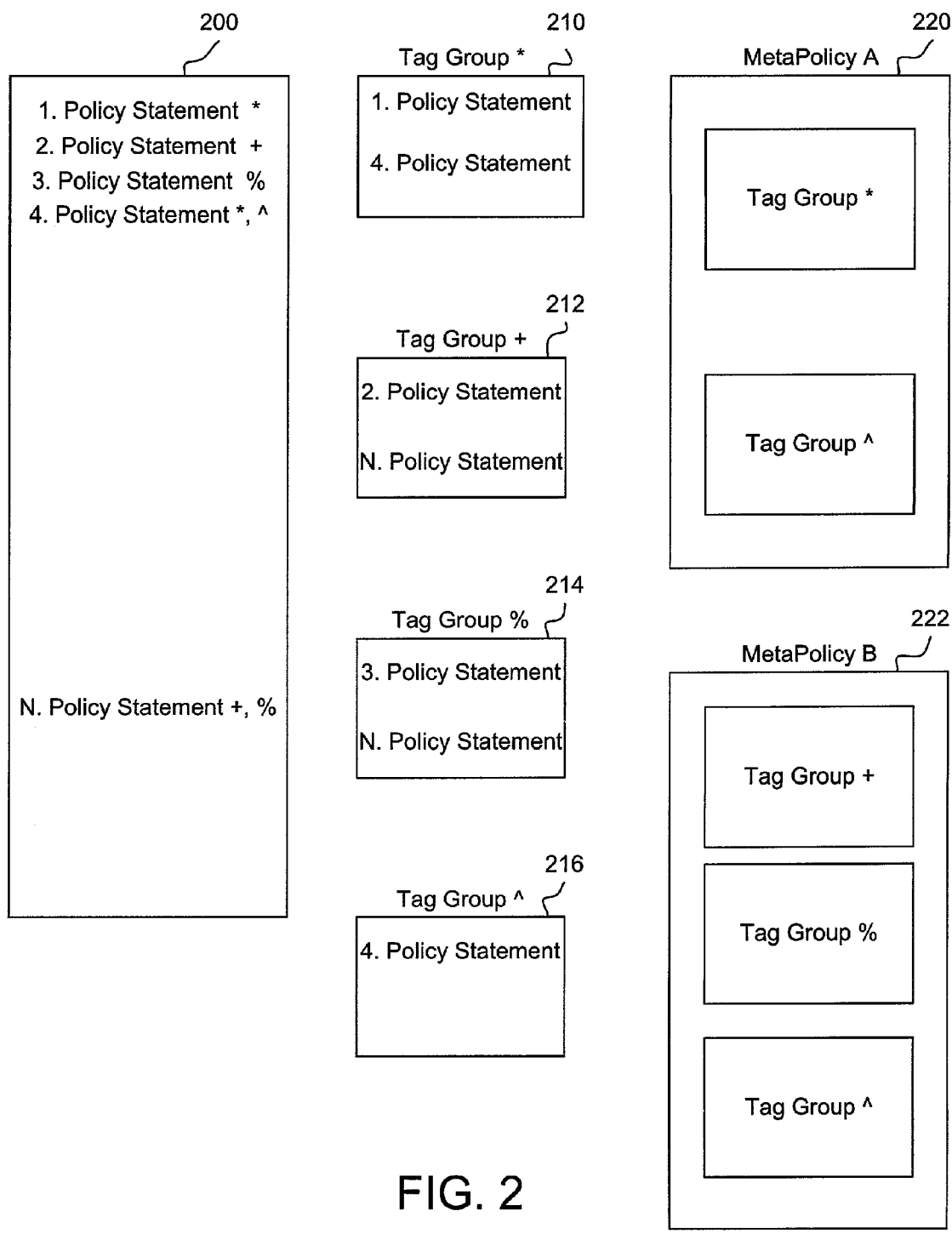
FIG. 2 is a diagram showing the relationships between policy statements, tag groups, and metapolicies, in accordance with one embodiment of the invention.

FIG. 2 is a diagram showing the relationships between policy statements, tag groups, and metapolicies, in accordance with one embodiment of the invention. A group 200 of tagged policy statements is shown. Each policy statement in group 200 has an associated tag or tags that organize the policy statements into tag groups. Group 200 is a subset of all the policy statements in the security policy. In one embodiment, group 200 includes all of the policy statements in the security policy, and in another embodiment group 200 includes fewer than all of the policy statements in the security policy.

FIG. 2 shows four tag groups 210, 212, 214, and 216. A tag group may include a minimum of one policy statement, for example tag group 216, or a maximum of the total number of policy statements in group 200. The tag groups are organized into metapolicies, for example a metapolicy A 220 and a metapolicy B 222. Metapolicy A 220 includes tag group 210 and tag group 216. Metapolicy B 222 includes tag group 212, tag group 214, and tag group 216. A metapolicy contains a minimum of one tag group and a maximum of the total number of tag groups associated with group 200 of tagged policy statements. Tag groups are organized into subsections, where each subsection is associated with a particular policy statement.

Security administrator 110 applies tags to the policy statements using the security policy management application. In an example, the policy statements relating to the security of a UNIX network are tagged with one tag, and the policy statements relating to the security of a Windows NT® network are tagged with another tag. Another tag group contains policy statements about general network security. Security administrator 110 may then create a metapolicy for users of the UNIX network using the appropriate tag groups and another metapolicy for users of the NT® network using the appropriate tag groups. In this example, both metapolicies will include the tag group containing policy statements about general network security.

The tags and tag groups allow security administrator 110 to create metapolicies that are appropriate for specific audiences. Some audiences, for example temporary employees, should only have a very limited access to the security policy and security administrator 110 is able to create just such a metapolicy. Other audiences only need access to the portions of the security policy that concern them, for instance users of the UNIX network would find information regarding the security of the organization's accounting information unnecessary.

Context is a collection of tokens that allows for multiple views of a single metapolicy. Different standards, guidelines, and procedures may be selected for presentation to different audiences using context as a filter for a metapolicy. Each subsection (collection of standards, guidelines, and procedures that support a policy statement) has an associated context mask that is a Boolean expression of tokens. A context manager at application server 116 adds and removes tokens from a current context as a user navigates a metapolicy. When a policy statement is accessed, a context filter determines which subsections will be displayed based on the following steps:

```
For each subsection
    For each token in the subsection's context mask
        If the token is defined in the current context
            replace all occurrences of the token with TRUE
        else
            replace all occurrences of the token with FALSE
    Evaluate resulting Boolean expression to produce display flag
    If display flag is TRUE, display the subsection
        else do not display the subsection.
```

Various pieces of supporting information are associated with different parts of the security policy. The supporting information enables many extended features of the database-modeled security policy. The supporting information types include author, owner, enforcement, reporting, review, violation action, exception/change request, effective date, security improvement projects, threats, and additional information. Author information identifies the individual who drafted a particular item, which establishes authorship of wording in case clarification is needed. Author information may be associated with each part of the security policy (policy statements, standards, guidelines, procedures, subsections, and metapolicies). Owner information identifies the group or function that owns the item. The owner is the primary point of contact for questions or clarification of the associated item, and is responsible for periodic review of the item. Owner information may be associated with each part of the security policy.

Enforcement information identifies the group or function responsible for carrying out the enforcement of a policy statement. Enforcement information is associated with standards, guidelines, and procedures since these items define enforcement of policy statements. Enforcement information also includes a link to enforcement actions, which may be periodic, on-demand, or continuous. Periodic enforcement actions are taken on a regular basis, for example a weekly review of a firewall log. On-demand enforcement actions are taken in response to a predefined condition or event (trigger), for example investigating the source of an intrusion attempt. Continuous enforcement actions are a permanent state of being, for example mandating that all employees will wear identification badges at all times.

Reporting information identifies reporting responsibility and may be associated with each part of the security policy. Security administrator 110 receives periodic reports regarding each metapolicy, and the reporting information identifies the person to make the report, the frequency of reports, and the content of reports, and includes an online report template. Review information indicates the review period and the last review date for each part of the security policy. A timer-based processor within the security policy management application sends an electronic notice to the owner of a policy item with the item comes up for review. The deadline for this review may be set and created as a milestone in a global project plan.

Violation information defines actions to be taken if policy items are not adhered to or are violated. Violation information may be associated with standards, guidelines, and procedures. Exception/change request information defines a process for requesting a change or a waived exception to a particular standard, guideline, or procedure. Effective date information indicates the date that a particular policy statement, standard, guideline, or procedure went into effect. Security improvement project information provides a link to a project detail page for any security improvement project related to the policy item, which can be any part of the security policy. Threat information defines the threats that each policy item was created to address. Additional information data provides HTML links to additional information about a part of the security policy such as whitepapers, newsgroups, or vendor sites.

Figure 3:
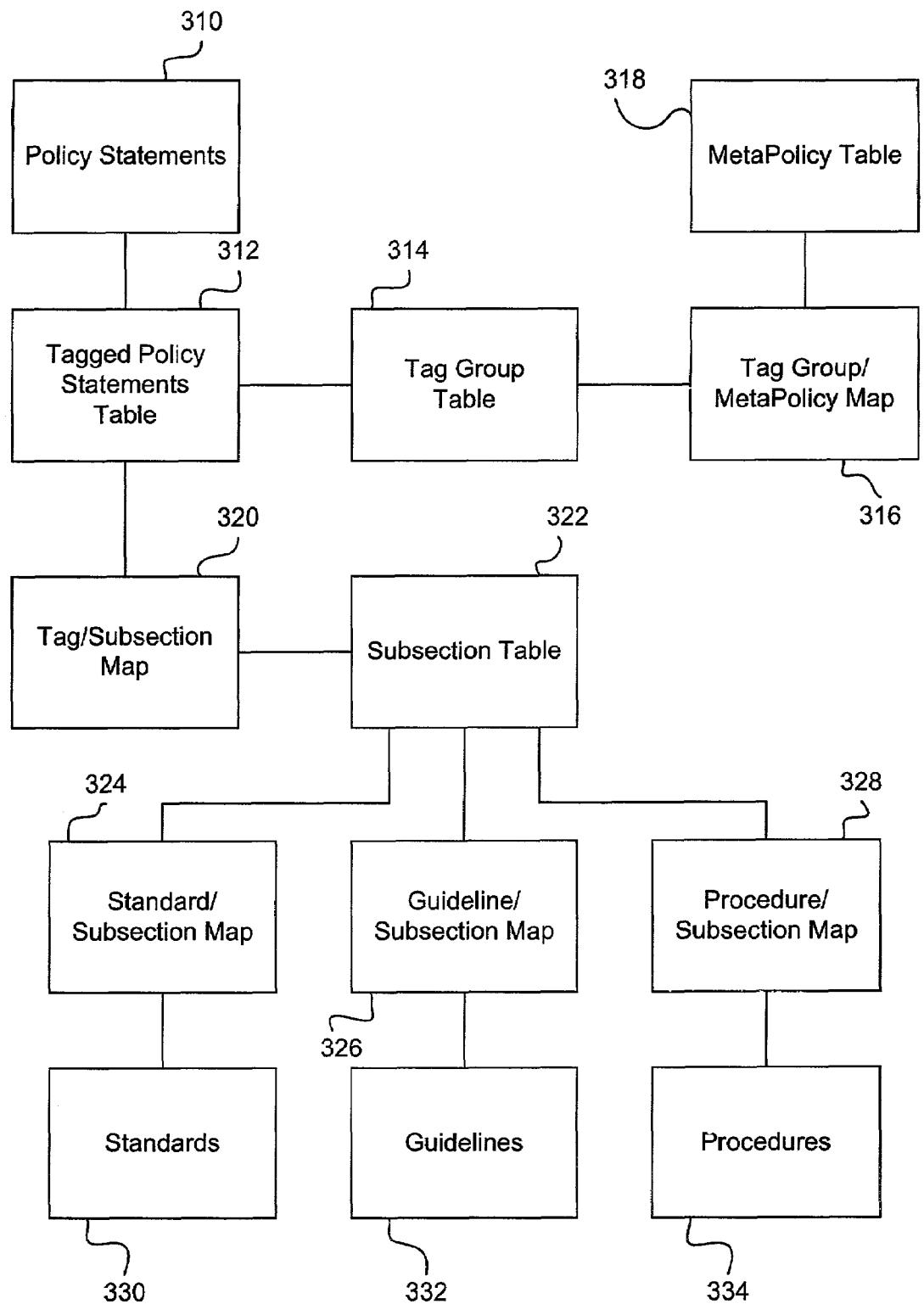
FIG. 3 is a block diagram of one embodiment of a structure of the database of FIG. 1, in accordance with the invention.

FIG. 3 is a block diagram of one embodiment of a structure of the database 112 of FIG. 1, in accordance with the invention. Policy statements 310, standards 330, guidelines 332, and procedures 334, although associated with one another, are all stored in separate modules. Tagged policy statements 312 are linked to policy statements 310, tag groups 314, and a tag/subsection map 320. Tag groups 314 are also linked to a tag group/metapolicy map 316, which in turn is linked to metapolicies 318. Tag group/metapolicy map 316 stores the correspondences between tag groups 314 and metapolicies 318, and allows a single policy statement to be stored once in database 112 but appear in a plurality of metapolicies 318.

Tag/Subsection map 320 is also linked to subsections 322 that allow a subset of standards 330, guidelines 332, and procedures 334 of a policy statement to be included in a specific metapolicy. Security administrator 110 creates subsections 322 of policy statements including various standards 330, guidelines 332, and procedures 334. A standard/subsection map 324 contains information relating various standards 330 with subsections 322. A guideline/subsection map 326 contains information relating various guidelines with subsections 322. A procedure/subsection map 328 contains information relating various procedures 334 with subsections 322. A particular standard, guideline, or procedure may be included in more than one subsection. Standard/subsection map 324, guideline/subsection map 326, and procedure/subsection map 328 allow each standard, guideline, and procedure to be stored in only one location, but appear in many different subsections and therefore in many different tag groups and metapolicies. The structure shown in FIG. 3 allows for great flexibility in organizing the security policy and preparing metapolicies 318 that are appropriate for various audiences without increasing the amount of storage space needed to store the security policy in database 112.

Figure 4A:
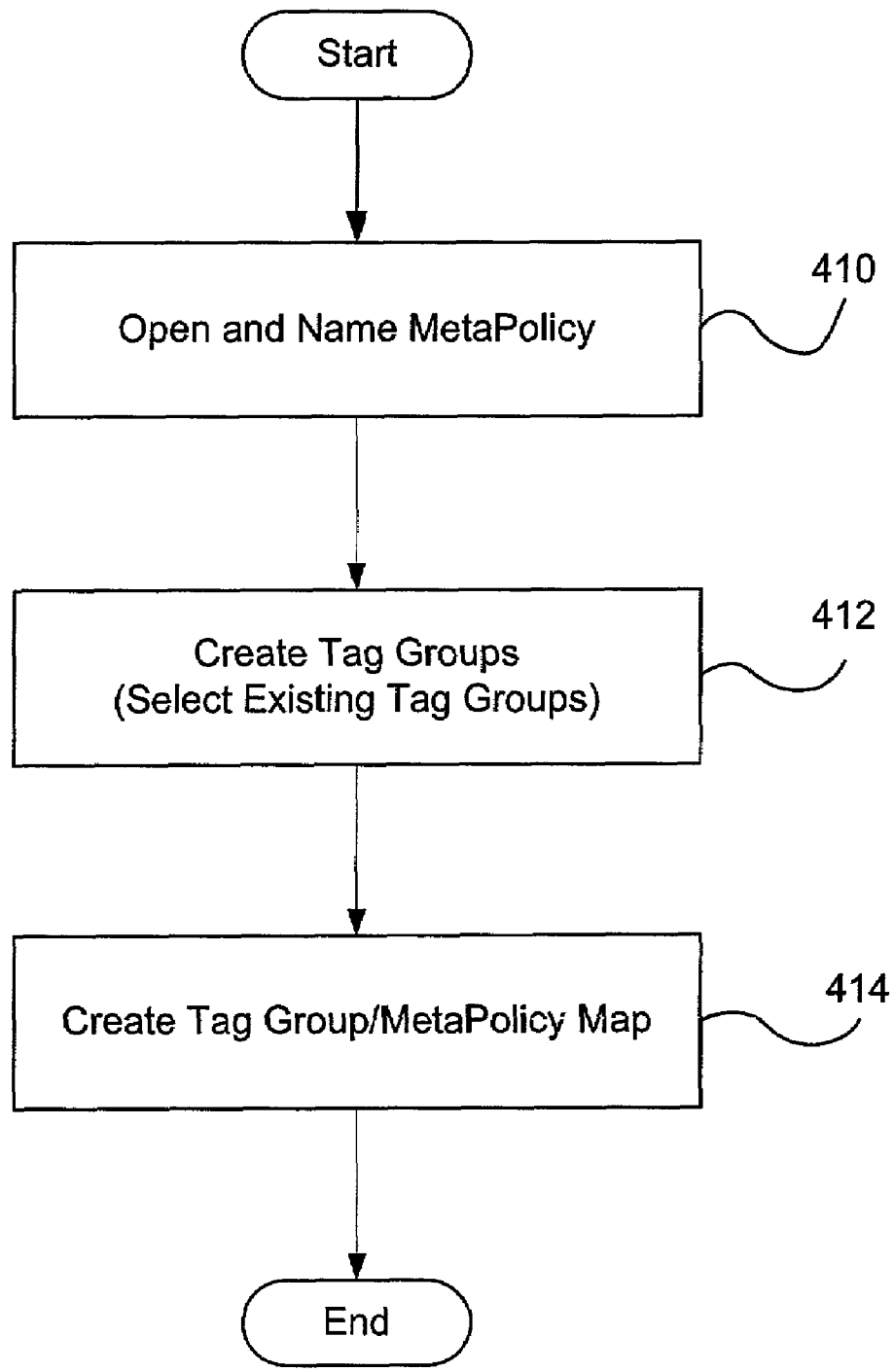
FIG. 4A is a flowchart of method steps for creating a metapolicy, in accordance with one embodiment of the invention.

FIG. 4A is a flowchart of method steps for creating a metapolicy, in accordance with one embodiment of the invention. In this embodiment, security administrator 110 uses the security policy management application to create the metapolicy. In step 410, security administrator 110 opens and names the metapolicy. Then, in step 412, security administrator 110 creates tag groups of policy statements that are required for the metapolicy. Security administrator 110 may alternately select existing tag groups to include in the metapolicy or select existing tag groups to add with any newly-created tag groups. Details of step 412 are further discussed below in conjunction with FIG. 4B. In step 414, security administrator 110 creates a new tag group/ metapolicy map that reflects the relationship between tag groups and the new metapolicy.

Figure 4B:
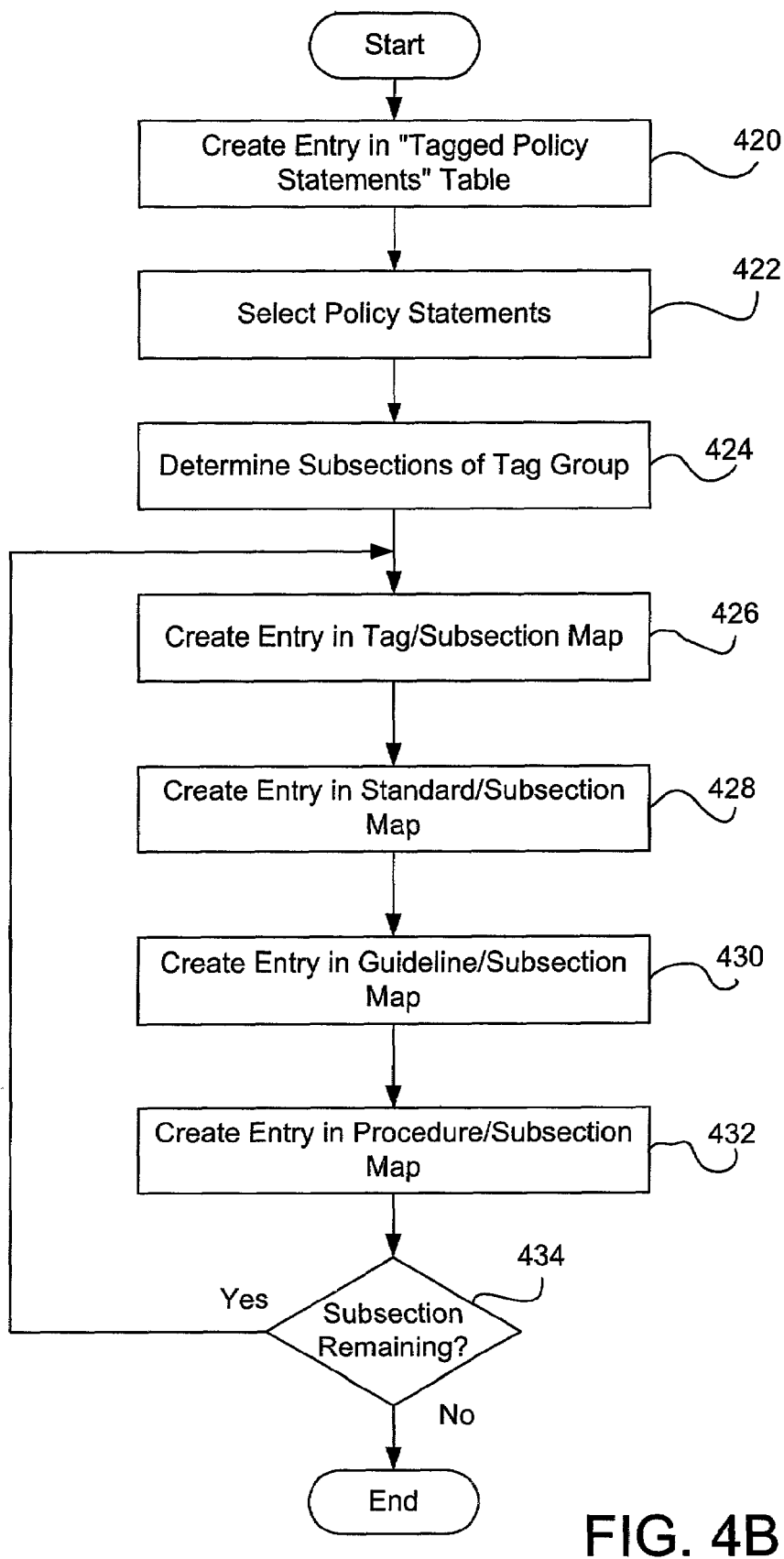
FIG. 4B is a flowchart of method steps for creating a tag group, in accordance with one embodiment of the invention.

FIG. 4B is a flowchart of method steps for creating a tag group, in accordance with one embodiment of the invention.

In step 420, security administrator 110 creates an entry in tagged policy statement table 312, thus creating a new tag. Then, in step 422, security administrator 110 tags the policy statements 310 that are to be included in the new tag group. In step 424, security administrator 110 determines a number of subsections for the new tag group and names any new subsections in subsection table 322.

In step 426, security administrator 110 creates an entry in tag/subsection map 320 for a subsection associated with the new tag group. In step 428, security administrator 110 creates an entry or entries in standard/subsection map 324, which effectively selects standards to be included in the subsection. In step 430, security administrator 110 creates an entry or entries in guideline/subsection map 326, which effectively selects guidelines to be included in the subsection. In step 432, security administrator 110 creates an entry or entries in procedure/subsection map 328, which effectively selects procedures to be included in the subsection. In step 434, if there are subsections remaining, the method continues with step 426 for the next subsection. If there are no subsections remaining, the method ends.

Figure 5:
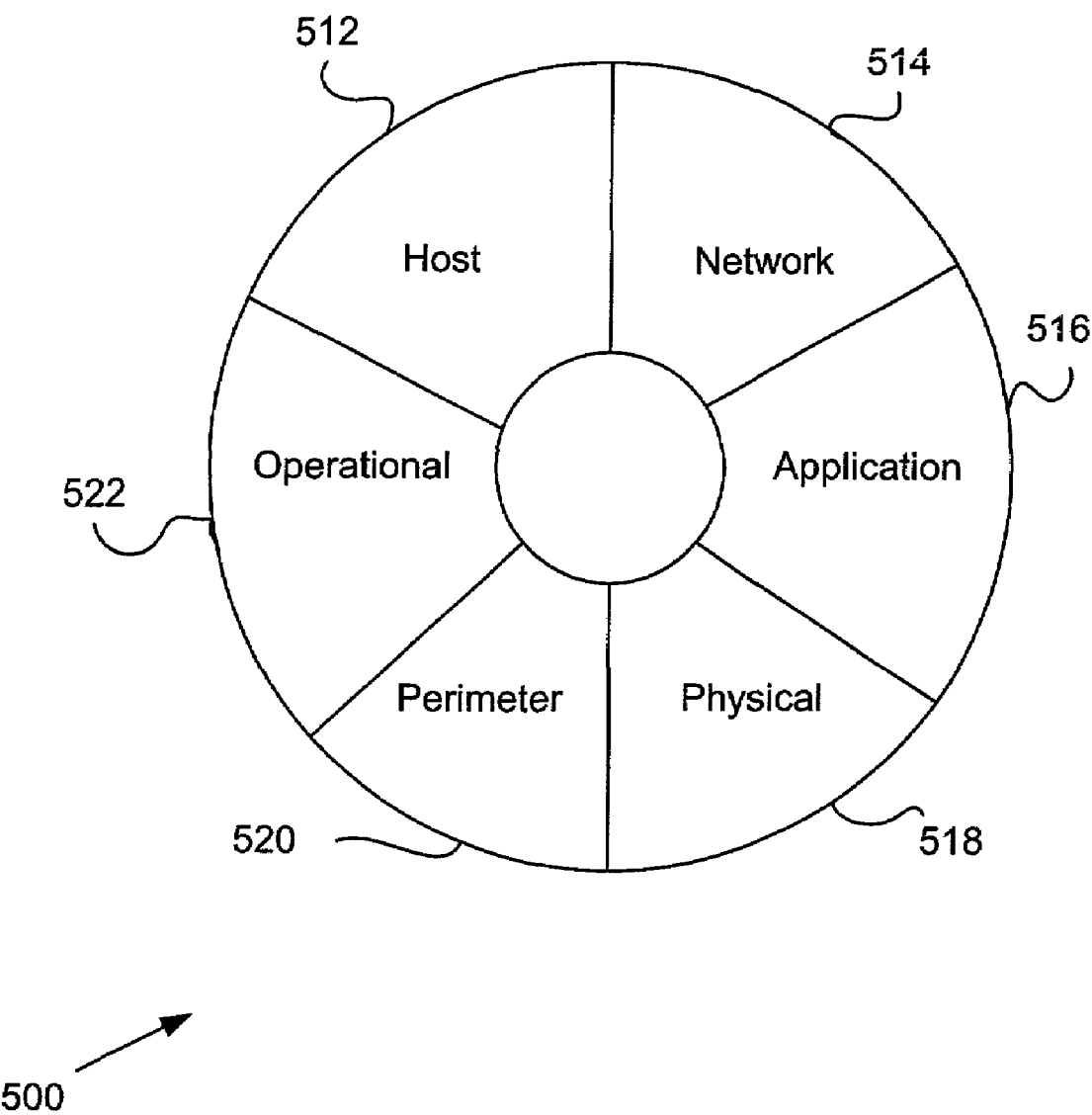
FIG. 5 is a diagram of one embodiment of a display showing status of a comprehensive metapolicy, in accordance with the invention.

FIG. 5 is a diagram of one embodiment of a display 500 showing status of a comprehensive metapolicy, in accordance with the invention. The comprehensive metapolicy is an embodiment of a metapolicy that includes every policy statement in the security policy once. Display 500 shows the status of the domains of the security policy, including a host 512 domain, a network 514 domain, an application 516 domain, a physical 518 domain, a perimeter 520 domain, and an operational 522 domain. Although only six domains are shown in FIG. 5, a security policy with any number of domains is within the scope of the present invention. The status of each domain is shown by colors in display 500. In one embodiment, the color of each domain section varies between red, amber, and green depending upon the status of the security policy in that domain. Other color schemes including a gray scale are within the scope of the invention.

Display 500 of the comprehensive metapolicy allows security administrator 110 and others to determine at a glance the status of the domains of the security policy. The status of each domain is determined according to a score $S_D$. The first step in calculating each score is weighting, which involves enumerating the various information types managed by the organization and determining the relative importance of the confidentiality, integrity, and availability of each information type. Examples of information types are customer information, product information, and supplier information. A weighting matrix, shown below, has rows and columns equal to confidentiality (c), integrity (i), and availability (a) for each information type (IT), where the left to right diagonal is set to one.

|      | IT1c | IT1i | IT1a | IT2c | IT2i | IT2a | ... | ITNc | ITNi | ITNc |
|------|------|------|------|------|------|------|-----|------|------|------|
| IT1c | 1    |      |      |      |      |      |     |      |      |      |
| IT1i |      | 1    |      | X'   |      |      |     |      |      |      |
| IT1a |      |      | 1    |      |      |      |     |      |      |      |
| IT2c |      | X    |      | 1    |      |      |     |      |      |      |
| IT2i |      |      |      |      | 1    |      |     |      |      |      |
| IT2a |      |      |      |      |      | 1    |     |      |      |      |
| ...  |      |      |      |      |      |      |     |      |      |      |
| ITNc |      |      |      |      |      |      |     | 1    |      |      |
| ITNi |      |      |      |      |      |      |     |      | 1    |      |
| ITNa |      |      |      |      |      |      |     |      |      | 1    |

Each cell of the weighting matrix has a value based on the relative importance of the items that intersect there. For example, X is calculated as a result of the following assessment:

"How much more important is the confidentiality of IT2 than the integrity of IT1?"

X=1 equal importance
3 moderately more important
5 strongly more important
7 very strongly more important
9 extremely more important If IT2c is less important than IT1i, then the inverse of X is used. In the weighting matrix shown above X'=1/X. The pair-wise comparisons only need to be performed for the cells beneath the left to right diagonal. Pair-wise comparisons are effective because each comparison requires human judgment and such a judgment is easier performed when choosing between two alternatives rather than trying to rank many items sequentially all at one time.

Once the weighting matrix is complete, it is normalized and the weight of each information type-property item is derived. A normalizing coefficient (NC) is equal to $$1/\sum_{i,j} WM_{i,j},$$

where WM is the weighting matrix. The weight W of each information type-property item is equal to $$\left(\sum_{j} WM_{i,j}\right) \cdot (NC).$$

For an exemplary weighting matrix:

|      | IT1c | IT1i | IT1a |
|------|------|------|------|
| IT1c | 1    | 4    | 2    |
| IT1i | 1/4  | 1    | 1/2  |
| IT1a | 1/2  | 2    | 1    |

NC=1/12.25=0.0816

W1c=(1+4+2)(0.0816)=0.571

W1i=(¼+1+½)(0.0816)=0.143

W1a=(½+2+1)(0.0816)=0.286

The weights show the relative importance for each critical security property (confidentiality, integrity, availability) of each information type. The total for the weights of each information type is equal to one.

The next step in determining each domain score $S_D$ is assessing the degree to which policy statements contribute to satisfying the key security properties of each information type. Weighting matrices are computed for each information type-property pair, where the values of the matrices are local effectiveness scores calculated according to the following assessment:

"How much more does policy statement Y contribute to the (property) of (information type) than policy statement Z?"

The third step in determining each domain score SD is synthesizing the local effectiveness scores with the weights. A synthesis matrix is constructed with policy statements for the rows and information type-property pairs for columns. The values of the synthesis matrix are global contribution scores and are calculated as $$GC_x = \sum_j (SM_{i,j})(W_i),$$

where i indicates a particular information type-property pair and x identifies a particular policy statement. The global contribution scores indicate the contribution of each policy statement to the overall security of the organization.

The fourth step in determining each domain score $S_D$ is determining a local score for each policy statement, $L_P$. To determine a local score for each policy statement, an assessor, such as auditor 132 or user 136, compares the state of the organization with the standards that support each policy statement and assigns a score for each standard. This score is then multiplied by the standard's contribution factor (CF). Each standard's contribution factor is determined by the author of the standard when the standard was written. The author performs a pair-wise comparison on the standards for each policy statement to determine the relative importance of each standard in supporting the policy statement. This can be done using a weighting matrix similar to the one described above for information type-property pairs. Thus, for each policy statement P, $$L_P = \sum_i (CF_{si})(\text{Score}_{si})$$

where si is a standard that supports policy statement P.

The fifth step in determining each domain score $S_D$ is synthesizing the local scores of each policy statement with the global contribution of the policy statement. A global score for each policy statement ($G_P$) is calculated by multiplying the global contribution by the local score. The domain score $S_D$ is thus calculated as $$S_D = \sum_P G_P = \sum_P (GC_P)(L_P).$$

In one embodiment, the numerical domain score $S_D$ for each domain is associated with a color that is displayed in display 500 of FIG. 5. A user may click on one of the domains in display 500 and the scores of the subsections of that domain are displayed. In other embodiments of display 500, the numerical score $S_D$ may be displayed instead of, or in conjunction with, a displayed color.

The invention includes three types of scoring scenarios: periodic update, informal assessment, and formal audit. A periodic update is performed as part of a routine security improvement process to reflect changes made to the organization or its technology. When performing a periodic update, auditor 132 (FIG. 1) can see the current score for each policy statement, and the current scores are updated immediately.

An informal assessment determines scores for policy statements that are separate from the current scores. Auditor 132 creates an informal assessment object, adds identifying information, indicates which areas of the comprehensive metapolicy are to be included, and indicates user access levels to the new assessment object. At the conclusion of the assessment, the results are discussed and an overall score is agreed upon. Individual scores are batch-updated for every affected policy item. In an informal assessment auditor 132 has access to the current scores of the policy items being assessed. A formal audit follows the same process as an informal assessment, except that auditor 132 does not have access to the current scores of policy items being audited.

Figure 6:
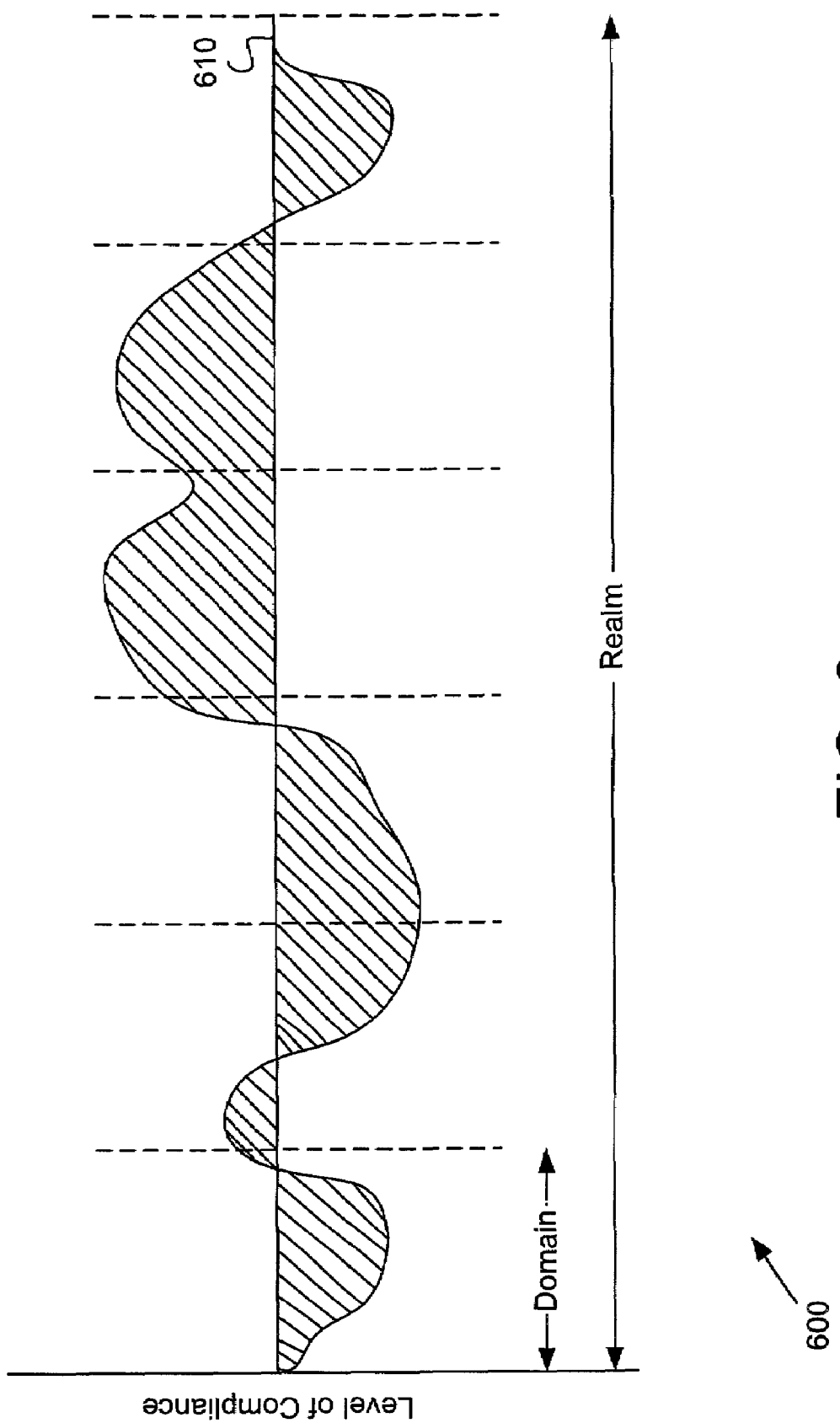
FIG. 6 is a diagram of one embodiment of a display showing level of compliance with a security policy, in accordance with the invention.

FIG. 6 is a diagram of one embodiment of a display 600 showing level of compliance with a security policy, in accordance with the invention. Display 600 shows the level of compliance of the security policy across a realm that includes six domains. Other embodiments of display 600 may include additional realms each including any number of domains. Each realm corresponds to a metapolicy and each domain corresponds to a tag group or section within the metapolicy. The level of compliance values shown in display 600 are the local scores $L_P$ for each policy statement in the comprehensive metapolicy. A threshold 610 represents a desired security posture for the organization. In one embodiment display 600 is color-coded where scores above threshold 610 are shown in green and scores below threshold 610 are shown in red.

In one embodiment, the database-modeled security policy operates in conjunction with project management tools to facilitate the creation and management of security projects. The project management tools include project definitions, team management, project plans and timelines, status reports, project prioritization, and collateral information. Project definitions include goals, constraints, requirements, and completion criteria. Team management includes contact information and role definition for team members. Team management may also include information about the skills of individuals to aid security administrator 110 in creating teams of individuals best suited for each project. Project plans and timelines define the goals of a project and deadlines or milestones for completion of the project.

Status reports are submitted by team members, for example user 136, to application server 116 via web server 118 and network 120. Security administrator 110 may then review the status reports. Team members can mark items in the status reports as critical or add comments to a critical section, which triggers an immediate notification to the defined project manager and/or security officer. Project prioritization allows security administrator 110 to assign priorities to security projects and modify these priorities as needed.

Security administrator 110 or other users 136 such as project managers or security officers create and manage security projects using the project management tools. Examples of security projects are anti-virus updates for a Windows NT® network, installing new security cameras in a building, and providing new employees with security badges. A security project may be a short-term project or an ongoing project that requires substantial management. For ongoing or long-term projects, the project management tools integrate with electronic mail and/or messaging services to automatically generate notices and reminders of key events, for example meeting reminders, project plan milestones, reminders for periodic tasks, policy review dates, notification when a status report contains a critical item, and notification when a local score ($L_P$) falls below a predetermined level.

Security administrator 110 can identify objectives that are appropriate for security projects from the local scores and domain scores. If scores are below the threshold for compliance in a certain area of security, security administrator 110 can create a project to address the deficiency. Security administrator 110 also uses the project management tools in conjunction with the contribution factors and weights of policy statements 310 to determine a priority for the project. Security administrator 110 uses the project management tools to identify team members with the skills needed for the project. As a security team typically has a fixed number of personnel, the invention allows security administrator 110 to allocate these limited resources in an efficient manner.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for security project management comprising:
   a security policy stored in a database;
   a security policy management application configured to interact with the security policy; and
   project management tools configured to operate in conjunction with the security policy management application.

2. The system of claim 1, wherein the project management tools include project definitions that are directly related to the security policy.

3. The system of claim 2, wherein the project definitions are directly related to areas of security that are below a threshold level of compliance as determined by the security policy management application.

4. The system of claim 1, wherein the project management tools include team management, such that team members are matched to a security project according to skills that correspond to an area of security of the security project.

5. The system of claim 4, wherein the area of security of the security project is defined by policy statements in the security policy.

6. The system of claim 1, wherein the project management tools include project plans and timelines.

7. The system of claim 1, wherein the project management tools include status reports.

8. The system of claim 7, wherein the status reports are prepared by team members and are submitted online for viewing by a project manager.

9. The system of claim 8, wherein the team members may indicate a section of one of the status reports as critical, which triggers an immediate notification to the project manager.

10. The system of claim 1, wherein the project management tools include project prioritization wherein priority of a project is directly related to weights of corresponding policy statements in the security policy.

11. The system of claim 1, wherein the project management tools include collateral information.

12. The system of claim 1, wherein the project management tools integrate with an electronic mail application to automatically send reminders.

13. The system of claim 1, wherein the project management tools integrate with an electronic messaging service to automatically send reminders.

14. A method for security project management comprising the steps of:
    storing a security policy in a database;
    configuring a security policy management application to interact with the security policy; and
    configuring project management tools to operate in conjunction with the security policy management application.

15. The method of claim 14, wherein the project management tools include project definitions that are directly related to the security policy.

16. The method of claim 15, wherein the project definitions are directly related to areas of security that are below a threshold level of compliance as determined by the security policy management application.

17. The method of claim 14, wherein the project management tools include team management, such that team members are matched to a security project according to skills that correspond to an area of security of the security project.

18. The method of claim 17, wherein the area of security of the security project is defined by policy statements in the security policy.

19. The method of claim 14, wherein the project management tools include project prioritization wherein priority of a project is directly related to weights of corresponding policy statements in the security policy.

* * * * *